US006002399A

United States Patent [19]
Haine et al.

[11] Patent Number: 6,002,399
[45] Date of Patent: Dec. 14, 1999

[54] APPARATUS AND METHOD FOR CREATING DIAGRAMS

[75] Inventors: Dominic Philip Haine, Mountain View, Calif.; Charles Federick Good, Milford, Ohio; Craig Steven Young, Zephyr Cove, Nev.

[73] Assignee: Apple Computer, Inc., Cupertino, Calif.

[21] Appl. No.: 08/491,234

[22] Filed: Jun. 16, 1995

[51] Int. Cl.[6] .................................................. G06T 1/00
[52] U.S. Cl. .......................................... 345/348; 345/334
[58] Field of Search .......................... 395/967, 333–335, 395/339, 348–349, 141–143, 133; 345/145, 157, 121

[56] References Cited

U.S. PATENT DOCUMENTS

| | | | |
|---|---|---|---|
| 4,672,575 | 6/1987 | Stephens | 395/334 |
| 4,813,013 | 3/1989 | Dunn | 395/333 |
| 5,287,439 | 2/1994 | Koga et al. | 395/133 |
| 5,301,301 | 4/1994 | Kodosky et al. | 395/967 |
| 5,511,157 | 4/1996 | Wang | 395/137 |
| 5,574,918 | 11/1996 | Hurley et al. | 395/967 |

*Primary Examiner*—Joseph H. Feild
*Attorney, Agent, or Firm*—Hickman Beyer & Weaver, LLP

[57] ABSTRACT

An apparatus in a computer for creating a diagram, which may include a plurality of symbols. The apparatus includes a graphical controller, which is associated with a symbol of the aforementioned diagram that is "selected." In one embodiment, the graphical controller includes a connector graphical controller for creating a first connector, which is coupled to the aforementioned selected symbol. Further, the graphical controller includes a symbol graphical controller for creating a new symbol, which new symbol is coupled to the aforementioned selected symbol by a second connector. The symbol graphical controller and the connector graphical controller are visually distinct from one another on the display screen so that the user may easily select either of the two for drawing diagram objects. In another embodiment, the invention further creates a temporary version of the aforementioned new symbol when the symbol graphical controller is held by the pointing device of the computer. The temporary version of the new symbol is advantageously capable of being moved around the computer display screen responsive to movement of the pointing device while the temporary version of the new symbol is held by the pointing device. To make the temporary version of the new symbol permanent into the aforementioned new symbol, users may release the temporary version of the new symbol at a user selected location on the display screen.

29 Claims, 13 Drawing Sheets

APPARATUS AND METHOD FOR CREATING DIAGRAMS

BACKGROUND OF THE INVENTION

The present invention relates generally to computer software. More particularly, the present invention relates to an improved apparatus and method for creating diagrams using a computer.

Software for creating diagrams and flowcharts are known in the art. To facilitate discussion of diagram and flowchart software, FIG. 1 illustrates a window showing a flowchart created in accordance with a prior art method. In FIG. 1, there is shown a window having a plurality of drawing tools along its border, including flowchart tool 200. Within the window, a flowchart having three symbols, 202, 204, and 206, is shown. To create the symbols of the flowchart shown in FIG. 1, users typically first select a flowchart tool 200. Upon selection of flowchart tool 200, the screen pointer, i.e., cursor, changes from a pointing mode (e.g., an arrow) to a flowchart mode (e.g., an outline of a bounding box or the ghost image of the first symbol to be created) to indicate that screen pointer manipulations henceforth will be interpreted as commands related to flowcharting.

Next, users may select a particular shape, e.g., rectangle, circle, or the like, from a symbol palette (not shown) to determine the shape of the next symbol to be placed in the window display area. To actually place a new symbol in the window display area, users then move the screen pointer to a desired location and click on a mouse button once to cause a symbol having a selected shape to appear on the display screen.

For discussion purposes, assume for the moment that symbol 202, representing the rounded rectangle in FIG. 1, is the first symbol being placed. Immediately after its creation, symbol 202 becomes the "selected" symbol, i.e., the symbol that is the focus of user operation. To subsequently create diamond symbol 204, users then pick a diamond symbol from the aforementioned symbol palette. The user may then click on a button 208 at the right edge of selected symbol 202 to cause diamond symbol 204 to appear next to the respective button clicked. For example, when button 208 is clicked, a new diamond symbol will appear to the right of button 208. Further, the newly created diamond symbol will have its left corner connected by the prior art flowcharting technique to the right edge of selected symbol 202.

To move the newly created diamond symbol to its final location, i.e., the location of symbol 204 shown in FIG. 1, users may then select the new created diamond symbol 204 and drag it to its final location. Typically, this operation is accomplished by first placing the screen pointer on the newly created diamond symbol, and depressing the mouse button to select it. The user may then drag the mouse while keeping the mouse button depressed to move the newly created symbol to its final location. While diamond symbol 204 is moved, the connector that couples its left corner to the right edge of symbol 202 is kept track of in memory. However, the aforementioned connector is not visually displayed during the move in the prior art. When diamond symbol 204 is released at its final location on the display screen, the connection materializes into connector 212, i.e., becomes visible.

Note that the prior art requires two distinct operations to create a new flowchart symbol: 1) creating a new symbol adjacent to a selected symbol by clicking on a button associated with the selected symbol, and 2) subsequently selecting and dragging the newly created symbol to its final location in the window display screen. Further, the connector between the newly created symbol and the selected symbol is not seen during the drag operation and only materializes in the window display screen once the user releases the newly created symbol at its final location.

To subsequently create circle symbol 206, users then reselect symbol 202 to cause buttons to appear thereon. Users may then select a circle symbol from the above-mentioned symbol palette and click on button 210 at the lower edge of selected symbol 202 to cause a new circle symbol to appear directly below button 210. As before, the prior art method automatically connects the upper edge of the newly created circle symbol to the lower edge of selected symbol 202. To place newly created symbol 206 at its final location in the window display screen of FIG. 1, users may again select the newly created circle symbol and drag it to its final location on the window display area. Again, the connector that couples between the lower edge of symbol 202 and circle symbol 206 is kept track of logically in memory but not visually presented on the screen during the move. Once the user releases the mouse button, circle symbol 206 is placed and the connector between it and symbol 202 materializes.

In the example of FIG. 1, diamond symbol 204 is shown connected to circle symbol 206 via a connector 218. To create connector 218, users in the prior art typically place the screen pointer in the center of one of the symbols to be connected, e.g., diamond symbol 204, and depresses the mouse button therein to change the screen pointer mode to a connecting tool (usually indicated visually as the screen pointer changes shape to a cross-hair). Users may then drag the cross-hair to the second symbol to be connected, e.g., circle symbol 206, and release the mouse button therein to create a connector between the two symbols.

Although the prior art flowchart creation technique represents a useful method for creating drawings, it has been recognized that improvements may be made. For example, the prior art typically defines connection points at fixed locations on a symbol. It has been recognized that users may wish to edit those locations and move connection points to user-selected locations on a symbol. Further, buttons in the prior art, e.g., button 208, include no visual indication of the drawing methodology. By way of example, symbols may be connected to each other by either right angle connectors, i.e., connectors for coupling between objects which is made up of only horizontal and vertical segments such as connector 212, or a straight connector adjoining two symbols along a straight line. In the prior art, if users wish to know which connector methodology is currently in operation, they must perform an independent check by, for example, checking a menu, or making a trial connection to visually determine the currently active connector methodology.

Further, the prior art method of creating connectors between two existing symbols, e.g., by requiring users to mouse down at the center of an existing symbol, invites errors. This is because users in the prior art must be careful in the placement of screen pointers in the first of the two symbols to be connected. By way of example, if a user places the screen pointer closer to the periphery of a symbol than at its center, the drawing mode may change to a moving mode instead of the desired connecting mode (e.g., the screen pointer may change to the shape of a hand instead of a cross-hair) when the mouse button is depressed. When those users drag the screen pointer to another symbol, they may inadvertently move the two symbols closer to one another instead of creating a connector therebetween, which is really the desired effect. Conversely, users may inadvertently create a connector between two symbols when they really intend to move the symbols closer to one another.

In view of the above-mentioned disadvantages, what is desired is an improved apparatus and method for creating diagram symbols and connectors. The improved apparatus and method preferably simplifies the creation and placement of new symbols and connectors. Further, the improved apparatus and method preferably provides improved visual indicators of the active connection methodology to render the diagram creation process more user-friendly, less error-prone, and more intuitive.

SUMMARY OF THE INVENTION

The invention relates to an apparatus in a computer for creating a diagram, which typically includes a plurality of symbols. The apparatus includes a graphical controller, which is associated with a symbol of the aforementioned diagram that is "selected." In one embodiment, the graphical controller includes a connector graphical controller for creating a first connector, which is coupled to the aforementioned selected symbol. Further, the graphical controller includes a symbol graphical controller for creating a new symbol, which new symbol is coupled to the aforementioned selected symbol by a second connector. Advantageously, the symbol graphical controller and the connector graphical controller are visually distinct from one another on the display screen so that the user may easily select either of the two for drawing diagram objects.

In another embodiment, the invention further creates a temporary version of the aforementioned new symbol when the symbol graphical controller is held by the pointing device of the computer. The temporary version of the new symbol is advantageously capable of being moved around the computer display screen responsive to movement of the pointing device while the temporary version of the new symbol is held by the pointing device. To make the temporary version of the new symbol permanent into the aforementioned new symbol, users may release the temporary version of the new symbol at a user selected location on the display screen.

In another embodiment, the invention relates to a method of creating a new symbol in a diagram on a computer display screen. The inventive method includes the step of providing a connector graphical controller and a visually distinct symbol graphical controller on a selected symbol of the diagram on the display screen. Further, the inventive method includes the step of creating a temporary version of the new symbol while the symbol graphical controller is held by the pointing device. In one embodiment, the temporary version of the new symbol is capable of being moved around the display screen responsive to movement of the pointing device while the symbol graphical controller is held. Further, the inventive method includes the step of creating a temporary version of a connector which is elastically coupled between the temporary version of the new symbol and the selected symbol as the temporary version of the new symbol is moved around the display screen. Additionally, the invention includes the step of making the temporary version of the new symbol permanent into the new symbol when the temporary version of the new symbol is released at a location on the display screen.

BRIEF DESCRIPTION OF THE DRAWINGS

Additional advantages of the invention will become apparent upon reading the following detailed description and upon reference to the drawings, in which.

DESCRIPTION OF THE PREFERRED EMBODIMENT

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, workspace, objects, symbols, connectors, or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping, holding, releasing, and the like. In any of the operations described herein that form part of the present invention, these operations are machine operations. Useful machines for performing the operations of the present invention include general purpose digital computers or other similar devices. Alternatively and equivalently, such manipulations may be partially or wholly provided in hardware logic, as will be appreciated by those skilled in the art.

Figure 1:
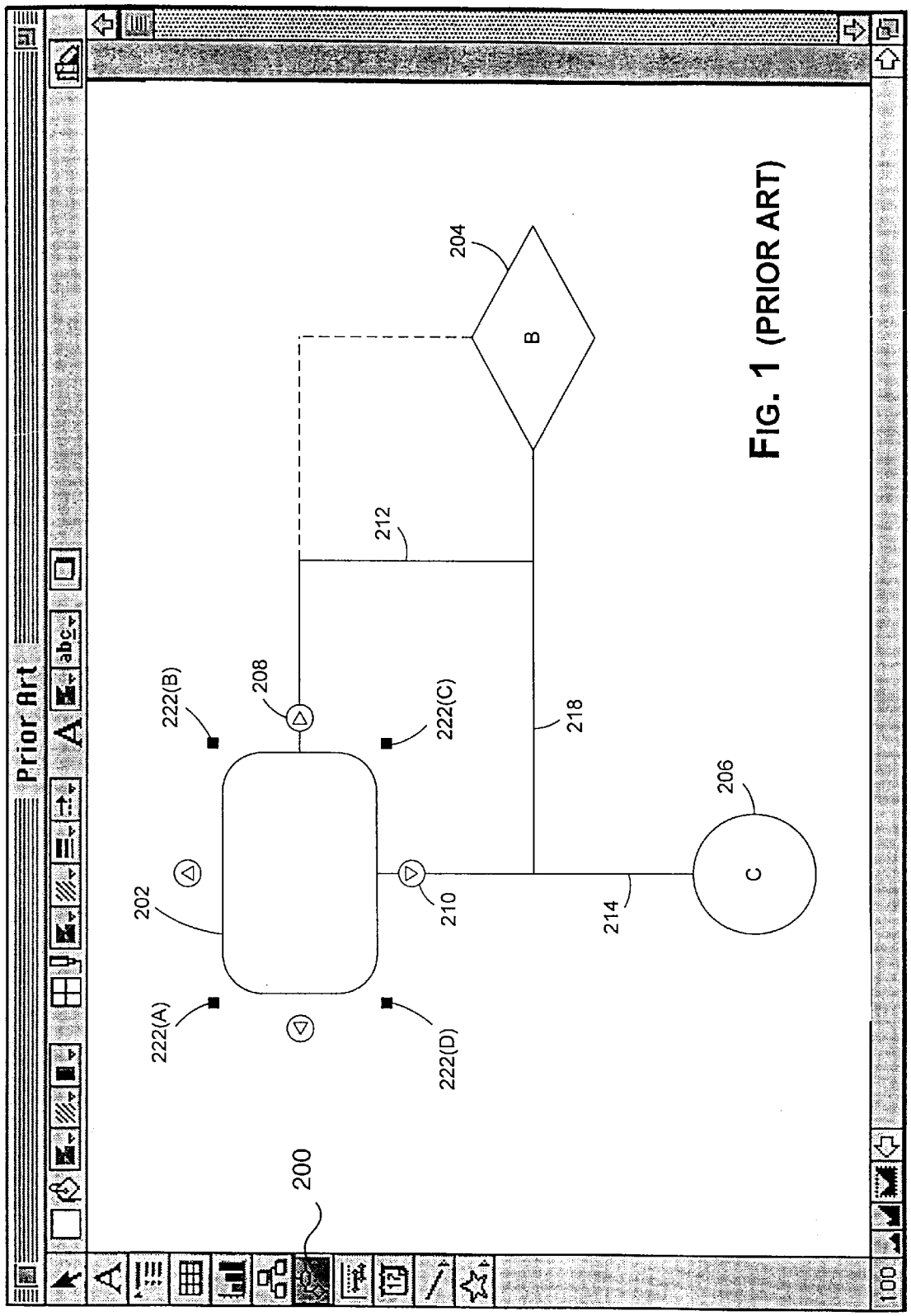
FIG. 1 illustrates a window showing a flowchart created in accordance with a prior art method.
Figure 2:
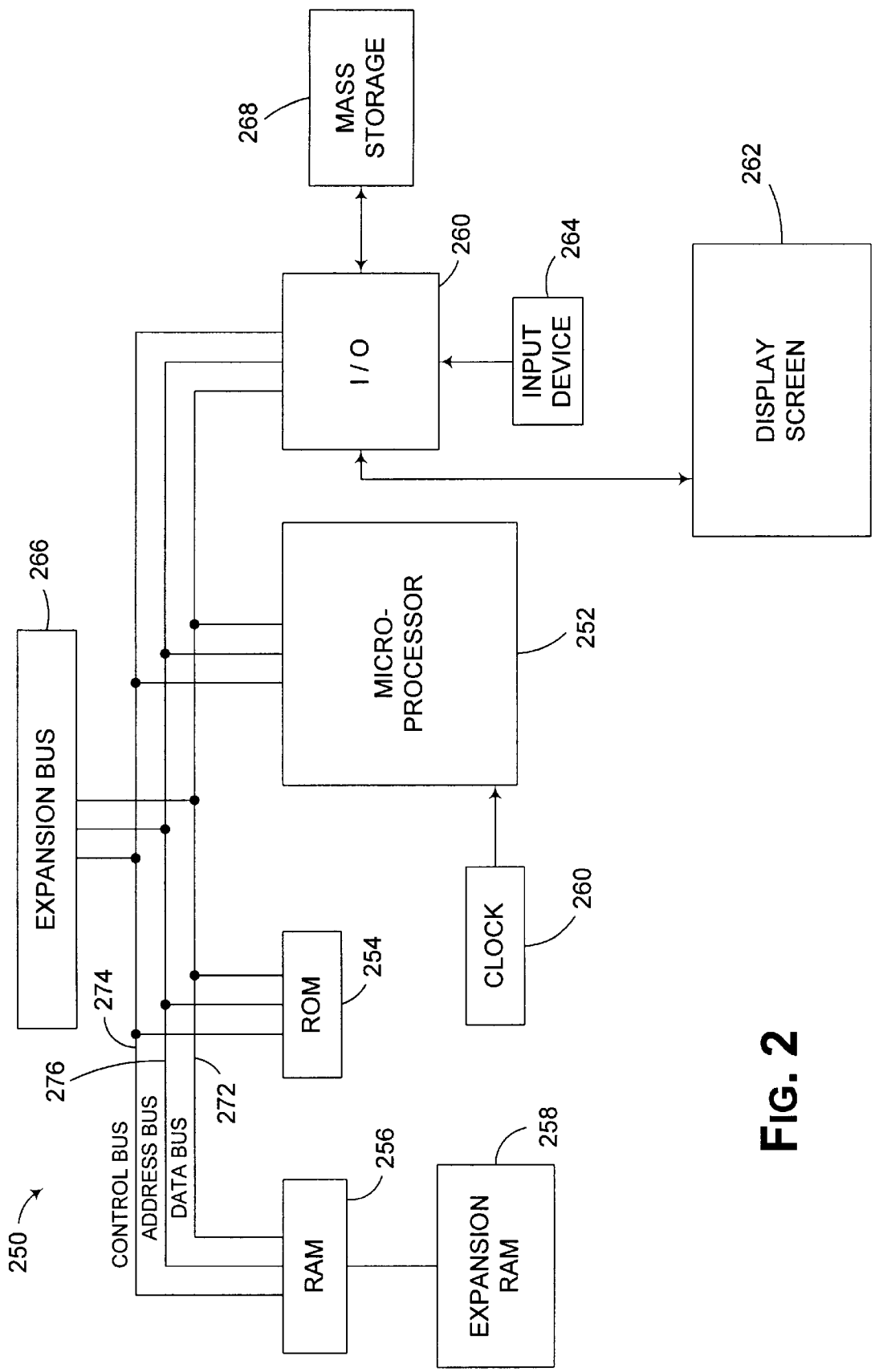
FIG. 2 shows a general purpose computer system for implementing the present inventive method.

In FIG. 1, a flowchart created in accordance with the prior art method is shown. FIG. 2 shows a general purpose computer system for implementing the present inventive method. Referring to FIG. 2, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260. In one embodiment, mass storage unit 268 may include units which utilizes removable computer readable media, such as floppy disks, opto-magnetic media, optical media, and the like for the storage of programs and data.

CPU 252 is preferably a commercially available, single chip microprocessor such as one of the Intel X86 or Motorola 680XX family of chips, or a reduced instruction set computer (RISC) chip such as the PowerPC™ microprocessor available from Motorola, Inc. CPU 252 is coupled to ROM 254 by a data bus 272, control bus 274, and address bus 276. ROM 254 may partially contain the basic operating system for the computer system 250. CPU 252 is also connected to RAM 256 by busses 272,274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268. Display assembly 262 of computer system 250 is an output device for displaying objects and other visual representations of data.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

In operation, information is inputted into the computer system 250 by typing on a keyboard, manipulating a mouse or trackball, or "writing" on a tablet or on a position-sensing screen (not shown) associated with display assembly 262. CPU 252 then processes the data under control of an operating system and an application program stored in ROM 254 and/or RAM 256. CPU 252 then typically produces data which is outputted to the display assembly 262 to produce appropriate images on its screen.

Expansion bus 266 is coupled to data bus 272, control bus 274, and address bus 276. Expansion bus 266 provides extra ports to couple devices such as modems, display switches, microphones, speakers, etc. to CPU 252.

The above-discussed computer represents, in one embodiment, the apparatus suitable for use in creating and editing diagrams. The inventive software for creating and editing diagrams will now be discussed in details.

Figure 3:
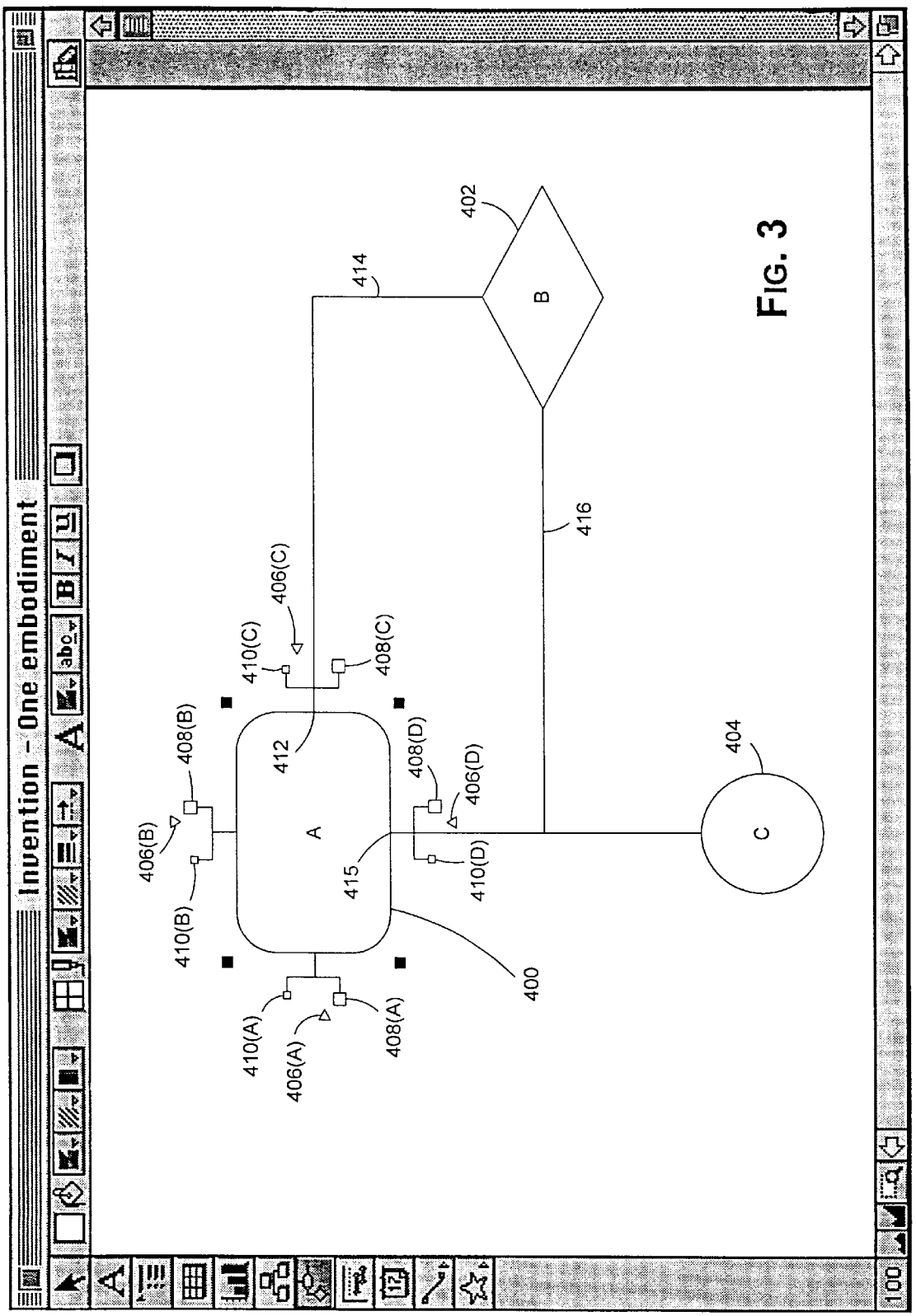
FIG. 3 illustrates, for discussion purposes, a diagram created in accordance with one embodiment of the inventive diagram creating method and apparatus.

FIG. 3 illustrates, for discussion purposes, a diagram created in accordance with one embodiment of the inventive diagram creating method and apparatus. As the term is used herein, diagrams includes, for example, flowcharts, organizational charts, electrical layout diagrams, or any other graphics-based presentation format in which blocks encapsulating data and/or devices are coupled together via lines. In the diagram of FIG. 3, there are shown three symbols: 400, 402, and 404. For purposes of discussion, assume for the moment that only rounded rectangle symbol 400 has been created and is now the selected symbol (as evidenced by the presence of the selection/resize handles surrounding rounded rectangle 400).

On selected symbol 400, there are shown a plurality of graphical controllers (GCCs) 406(a), 406(b), 406(c), and 406(d). In the example of FIG. 3, GC's 406(a)–406(d) are shown positioned at horizontal and vertical midpoints positions, i.e., at the 12 o'clock, 3 o'clock, 6 o'clock, and 9 o'clock positions on selected symbol 400. Each GC, for example, GC 406(a), includes a symbol graphical connector (GC), e.g., GC 408(a), and a connector graphical controller (GC), e.g., GC 410(a). It should be noted that although the GC's of FIG. 3 may appear visually connected to the selected symbol with which they are associated, such visual or apparent connection is not required.

A symbol GC is used for creating a new symbol which is coupled via one or more connectors to a selected symbol associated with that symbol GC. As shown in FIG. 3, a symbol GC may be represented by a simple small rectangular object. Alternatively, a symbol GC may resemble a version of the new symbol to be created therefrom. To create a new symbol, users preferably places a screen pointer, e.g., a cursor, proximate to or on a symbol GC, such as symbol GC 408(c), and manipulates a control associated with a pointing device in a specific manner so as to keep symbol GC 408(c) the focus of operation. In one embodiment, this involves "mousing down" on symbol GC 408, i.e., placing a screen pointer proximate to or on symbol GC 408, depressing a mouse button, and keeping the mouse button depressed. The process of placing the screen pointer in the proximity of or on a display object and manipulating a control associated with a pointing device in a specific manner so as to keep that display object the focus of operation is referred herein as "holding" that display object. When users manipulate the same or other controls associated with the pointing device to cease making the held display object the focus of operation, the display object is said to be "released."

As a symbol GC, e.g., symbol GC 408(c), is held, a temporary version of the new symbol to be created appears beside the selected symbol, e.g., beside selected symbol 400 in the example of FIG. 3. In one embodiment, the temporary symbol appears proximate to the location where the held GC previously occupies. Further, the temporary symbol is preferably a simplified version, visually speaking, of its associated new symbol. For example, there is displayed in one embodiment a bounding box or a ghost image for representing the temporary symbol. The representation of the temporary symbol in a simplified format advantageously reduces the computational and screen-update overhead involved when the temporary symbol is moved around the display screen. In another embodiment, however, the temporary symbol is visually represented as fully as the new symbol would be represented. As long as users continue to hold the temporary symbol, e.g., continue to keep the mouse button depressed after mousing down on a symbol GC, the temporary symbol may be moved around the display screen. When users release the temporary symbol at a location in the display area, e.g., by releasing the mouse button in one embodiment, the temporary symbol is made permanent into a new symbol at the location where the temporary symbol is released.

By way of example, if users want to create diamond symbol 402 at the location shown in FIG. 3, they typically hold symbol GC 408(c), thereby creating a temporary diamond symbol at the location where symbol GC 408(c) formerly occupies. While the temporary diamond symbol is held, users may then drag the temporary diamond symbol to its final location on the display screen of FIG. 3. The users may then release the temporary diamond symbol, e.g., by releasing the mouse button in one embodiment, thereby making the temporary diamond symbol permanent into new diamond symbol 402 at the location where its temporary version is released.

In another embodiment, the symbol GC itself resembles a smaller, simplified, or representative version of the new symbol to be created, thereby advantageously indicating to the user of the shape of the resulting new symbol even prior to its creation.

While the temporary diamond symbol of FIG. 3 is being dragged around the display screen, a visible temporary connector preferably couples between the temporary diamond symbol and the selected symbol, i.e., selected rounded rectangle symbol 400. It should be appreciated that while the temporary diamond symbol is being dragged around the display screen, the aforementioned visible temporary connector may change in shape and size correspondingly. Only when users release the temporary diamond symbol at a user-selected location does the temporary connector become permanent.

In one embodiment, selected symbol 400 preferably couples with the above-mentioned temporary connector at the root of GC 406(c). In another embodiment, however, the connector that connects symbols 402 and 400 may couple to symbol 400 at any predefined, non-arbitrary position. By way of example, users may specify beforehand that the connector between symbols 402 and 400 couples to selected symbol 400 at a location that is different from the point where GC 406(c) couples with selected symbol 400. The ability to define in advance on a symbol the connector location is especially advantageous in situations where the symbol may be too small or may have a shape that does not conveniently permit the placement of a GC at the location where connection to a connector should be made.

Figure 4A:
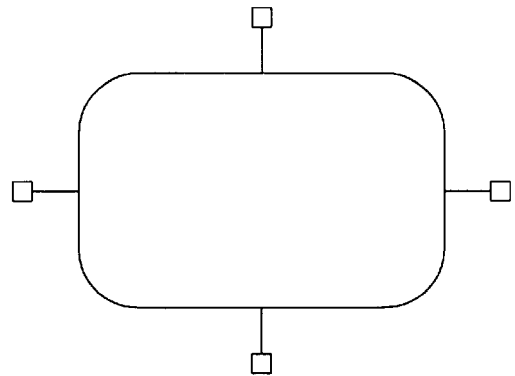
FIG. 4A shows an alternative embodiment of the present invention, including the simplified graphical controllers.

FIG. 4A shows an alternative embodiment of the present invention. In the embodiment of FIG. 4A, a selected symbol includes a plurality of simplified GC's, each of which, unlike the embodiment of FIG. 3, having no distinct symbol and connector GC's. The simplified GC of FIG. 4A preferably provides both symbol and connector creating capability. To create a new symbol, a user may hold the simplified GC and drags out a new symbol in the manner discussed earlier in connection with FIG. 3. However, the invention also provides a novel technique for creating connectors. If in the process of creating a new symbol, e.g., by holding a simplified GC, dragging out a new symbol, and moving that new symbol about the display screen, the new symbol comes close to another existing symbol, the inventive technique preferably visually removes the new symbol, thereby leaving its associated connector to be connected to the existing symbol. Alternatively users can, by appropriately manipulating keyboard keys and/or pointing device controls, cause the new symbol to be erased, whether or not the new symbol comes close to an existing symbol, to leave its associated connector to point to whatever location/object chosen by those users. As an alternative connector creation method, the user may click on the simplified GC to establish one end of the connector. Wherever the user clicks the second time defines the other end of the connector. For example, the user may click on an existing object in the display screen after having clicked on the simplified GC to create a connector between the selected symbol and the existing object. Because GC's are simplified in the embodiment of FIG. 4A, visual clutter is advantageously reduced.

Figure 4B:
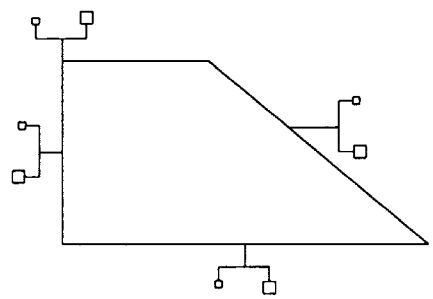
FIG. 4B shows a polygon symbol having thereon graphical controllers at non-symmetrical positions for facilitating a discussion of the inventive ability to edit connector positions on a symbol in accordance with one aspect of the present invention.

In accordance with one aspect of the invention, connector positions, i.e., the positions on a symbol where connector may couple, may be user-edited. Editing may be performed using a menu or an editing option from the above-mentioned symbol palette, wherein users can, for example, specify in a special edit window the positions on a symbol where connectors may be coupled. The ability to edit connector positions on a symbol is useful in situations where symbols are non-symmetrical, e.g., the parallelogram symbol of FIG. 4B. The above-mentioned editing ability may also allow users to create new symbols from existing ones. By way of example, users may be able to create a 3-AND gate symbol from an existing 2-AND gate symbol by merely editing the connector positions of the existing 2-AND gate symbol.

The invention permits, in one embodiment, users to specify the connector direction at the specified connector position. By way of example, users may specify that a connector coupled to a given connector position shall always be horizontally connected first, or even connected at a predefined angle. It should be kept in mind that the predefined angle may be absolute, e.g., relative to the coordinate space of the document, or relative to the symbol itself.

In another aspect of the invention, the inventive technique dynamically ascertains the shortest connector path between the temporary diamond symbol and selected symbol 400 and displays a temporary connector along this ascertained shortest connector path while the user moves the temporary diamond symbol around the display screen. By way of example, suppose that the active connection methodology is right-angled. It may be determined, say at some point, that a right angle connector path between point 412 on selected symbol 400 to point 414 on symbol 402 is shorter than a right angle connector path between point 412 and a point 416 on symbol 402. In which case, the invention preferably displays, in one embodiment, a temporary right-angled connector along the shorter path. If a user subsequently moves symbol 402 and a connector path between points 416 and 412 becomes shorter than a corresponding connector path between points 414 and 402, the method preferably aligns the temporary right-angled connector along this new shorter connector path. It should be noted that the logic for determining the shortest connector path applies to any connection methodology, including, for example, straight connectors.

In contrast, the prior art method of diagram creation inflexibly maintains the connection between the two points on symbols 402 and 400 which are closest at the moment new symbol 402 is created, i.e., points 412 and 414, even if it turns out subsequently that a connector path between points 415 and 414 is the shorter of the possible connector paths between these two symbols.

As mentioned earlier, a temporary symbol appears when a user holds a symbol GC. In one embodiment, the invention advantageously helps the user to make the mental connection between the act of holding a symbol GC and the ability to create a new symbol/connector. In the below example, suppose users want to create a new symbol by manipulating a symbol GC. In one embodiment, when users manipulate a screen pointer to indicate their intention to hold a symbol GC, e.g., by mousing down on the symbol GC or via any other predefined manipulation sequence of keyboard keystrokes and/or pointing device controls, the graphic controller disappears, to be replaced by a ghost image or bounding box of the symbol to be created. In one embodiment, the change from a GC to its replacement, e.g., the bounding box/ghost image of the symbol to be created may be an animation sequence, which may include sound, to convey the idea that the user must hold the symbol GC in order to create a new object. If the user fails to hold the symbol GC, e.g., merely clicks on the symbol GC instead of mousing down, the ghost image or bounding box of the symbol to be created disappears to signify that the user must hold the symbol GC in order to create a new object.

Similarly, if users hold a symbol GC, and after moving the resultant temporary symbol around the display screen decide not to create this new symbol, they may move the temporary symbol back to the proximate position where they started, i.e., the screen position formerly occupied by the symbol GC and release. In one embodiment, the inventive technique preferably removes the temporary symbol from the display screen and restores the symbol GC if the screen position where the temporary symbol is released is within a predefined distance from the position formerly occupied by the symbol GC. Accordingly, the inventive method and apparatus advantageously provides an automatic correction capability, which allows users to negate their intention of creating new symbols in a user-friendly and intuitive manner. It should be apparent and appreciated from the foregoing that this automatic correction capability applies to both symbol GC's and connector GC's.

Figure 4C:
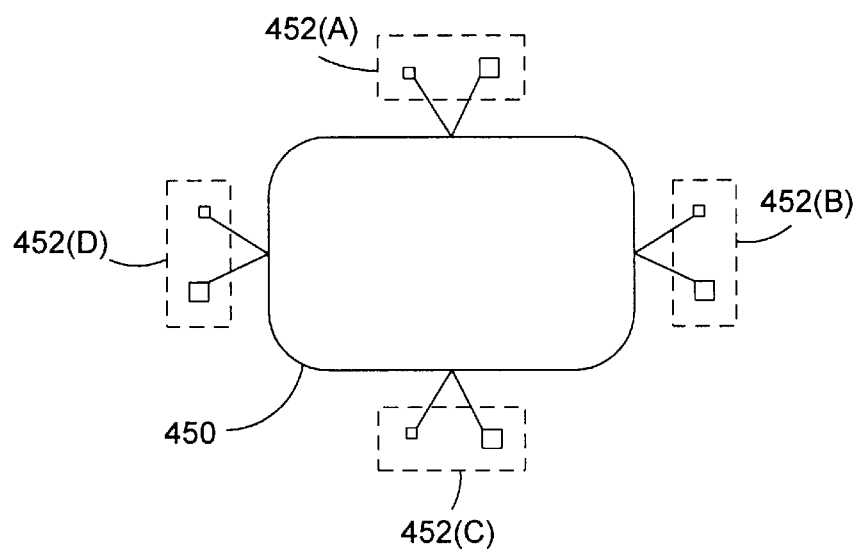
FIG. 4C shows, for the purpose of illustrating the improved visual indicator concept, a selected symbol which includes thereon a plurality of graphical controllers.

In accordance with another aspect of the invention, there is provided with GC's a visual indication of the connection methodology to which new connectors are expected to adhere. Connection methodologies for connectors include, for example, right-angled, straight (direct symbol-to-symbol), arrow (forward, backward, or double-headed), dotted connectors, center-to-center, or the like. FIG. 4C shows, for the purpose of illustrating the improved visual indicator concept, a selected symbol 450 which includes thereon GC's 452(a)–(d). Note that each GC thereon, whether a symbol GC or a connector GC, is coupled to selected symbol 450 by a short, straight segment to visually indicate to the user that the connector methodology is straight (direct symbol-to-symbol). If a GC is coupled to its associated selected symbol by a short double-headed arrow segment, for example, users are alerted that any new connector created thereby will assume the form of a double-headed arrow. As a further example, the right-angled segments coupling the GC's of FIG. 3 to their respective selected symbol serve to indicate to users that the connection methodology currently in effect is right-angled.

Figure 5:
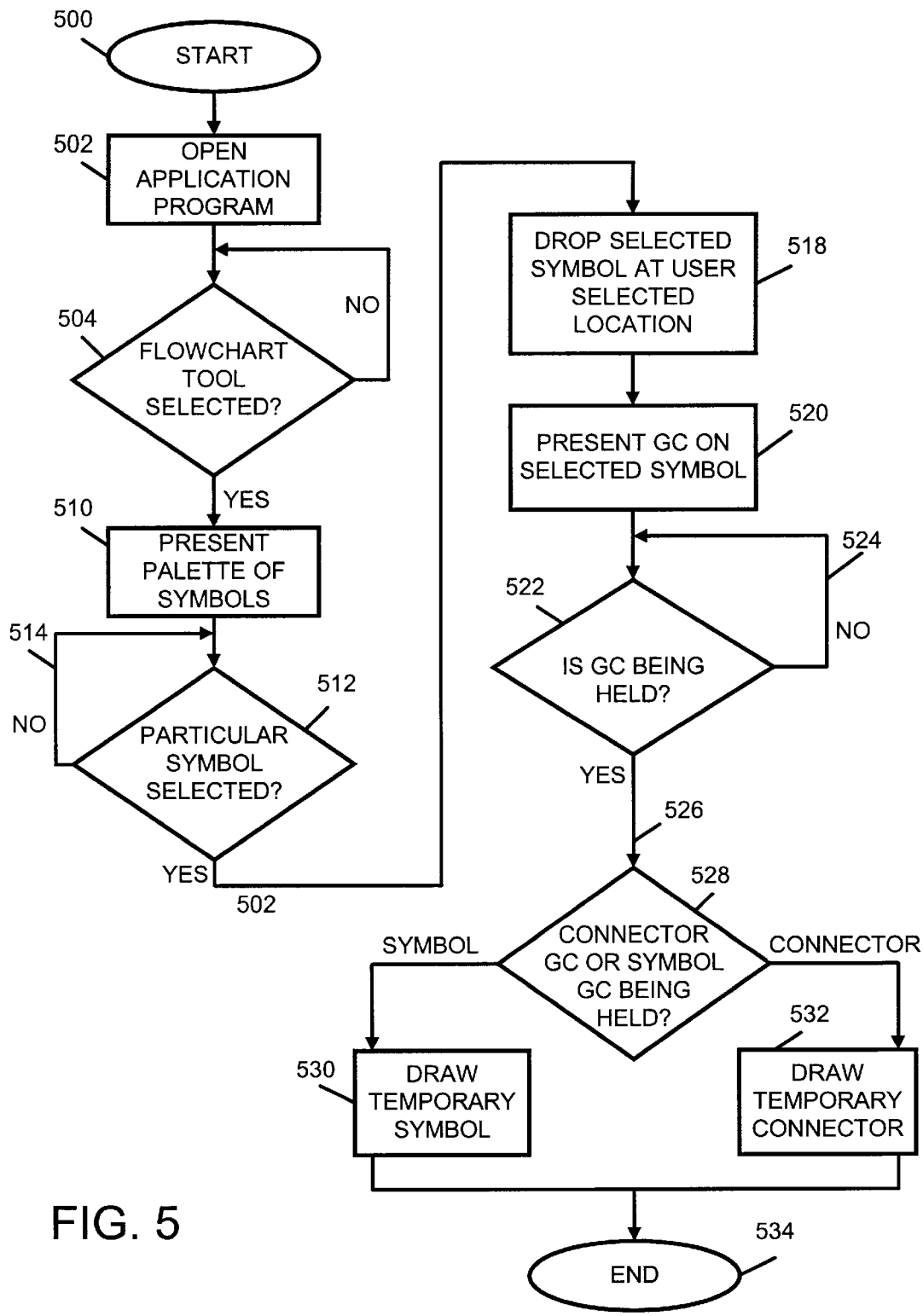
FIG. 5 is a flowchart illustrating the inventive diagram creating technique of the present invention.

FIG. 5 is a flowchart illustrating the inventive diagram creating technique of the present invention. FIG. 5 starts block 500. From block 500, the method proceeds to block 502 wherein the user may open an application program for creating a diagram. In block 502, the application program may be a stand-alone application, e.g., a presentation software package, or a graphical module in a document-oriented environment in which the graphical module is an embedded part, or the like. From block 502, the method proceeds to block 504 wherein the method ascertains whether the user has selected a diagram tool.

In one embodiment, the user may select a diagram tool by, for example, clicking on a diagram tool icon in a tool palette. When the diagram tool is selected, the method may, in one embodiment, change the shape of the screen pointer to another mode, e.g., a bounding box symbol, to signify that the diagram mode is currently in effect. If a diagram tool is not selected in block 504, the method simply waits by returning to block 504 via a path 506 as shown in FIG. 5.

On the other hand, if the user has selected a diagram tool in block 504, the method proceeds to block to 510 wherein a palette of symbols is presented to the user. The user may then select a symbol therein to choose the shape of the next symbol to be created. In block 512, the method ascertains whether the user has selected a particular symbol from the aforementioned palette of symbols. If the user has not selected a particular symbol, the method returns via a path 514 to block 512 to wait until a particular symbol from the aforementioned palette of symbols is picked. In one embodiment, the loop implemented by block 512 and path 514 are optional since the software program may select a default symbol for users if they do not specify one.

In block 518, a copy of the selected symbol is placed at a user selected location. For example, the user may have moved the screen pointer to a location on the display screen and clicked once to place the first symbol at a selected location. It should be noted that in one embodiment, blocks 510 and 518 may be interchangeable. In another embodiment, the method provides a default symbol for the first symbol to be dropped in block 518. In this embodiment, it is unnecessary to require the user to select a particular symbol via blocks 510 and 514. Alternatively, the first symbol to be created may be the last symbol used in the document/application, which was opened in block 502.

In block 520, the methods present the graphical controllers (GC's) on the selected symbol. Since the symbol dropped in block 518 is the first symbol, it is automatically deemed, in one embodiment, the selected symbol. As a result, the method automatically presents GCTs on this selected symbol. In block 522, the method ascertains whether a GC, e.g., a symbol GC or a connector GC, is being held.

If it is determined in block 522 that a GC is not held, the method returns to block 522 via a path 524 to wait until the user holds a GC. On the other hand, if it is determined in block 522 that a GC is held, the method proceeds to block 528 wherein it ascertains whether the GC held in block 522 is a symbol GC or connector GC. If there are no distinct symbol/connector GC's, as is the case in one embodiment, the method preferably determines whether the user intends to create a symbol or a connector in accordance with the determination method discussed earlier in connection with FIG. 4A.

In the discussion hereinafter, it is assumed that there are two distinct GCCs, i.e., a symbol GC and a connector GC, available. However, it should be borne in mind that the inventive technique is equally applicable, with changes apparent to those of skill in the art given this disclosure, to situations where there is only a single graphical controller for creating both new symbols and new connectors (as in the case of FIG. 4C).

If it is determined in block 528 that the user wishes to draw a new symbol, the method proceeds to block 530 wherein a temporary symbol is drawn. Thereafter, the method proceeds to block 534 wherein the steps of FIG. 5 end. On the other hand, if it is ascertained in block 528 that the user wishes to draw a new connector without creating a new symbol, the method proceeds to block 532 wherein the temporary connector is drawn. Thereafter, the method proceeds to block 534 wherein, as mentioned earlier, the steps of FIG. 5 end.

Figure 6:
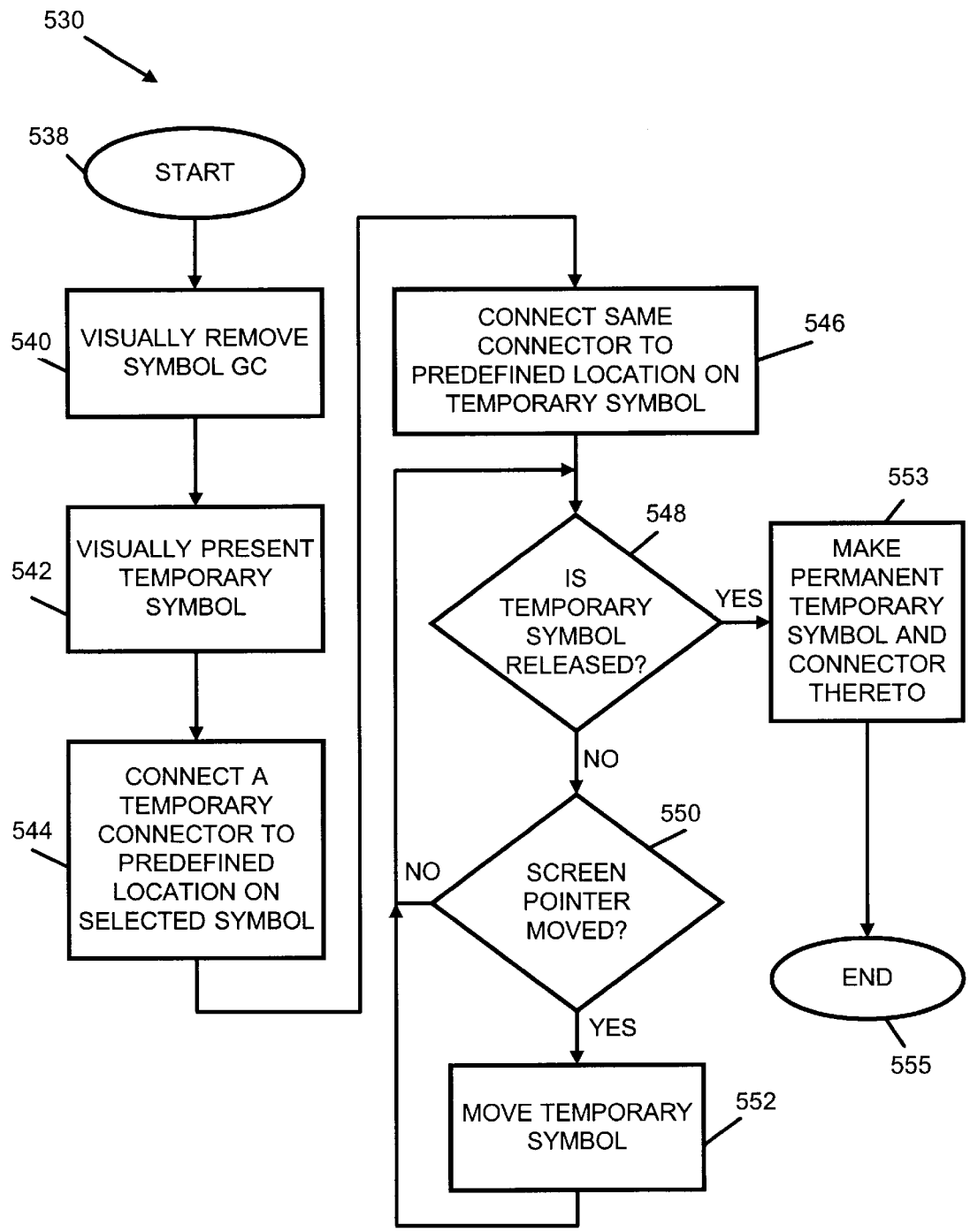
FIG. 6 is a flowchart illustrating the draw new symbol step 530 of FIG. 5.

FIG. 6 is a flowchart illustrating the draw new symbol step 530 of FIG. 5. FIG. 6 starts at block 538. In block 540, the method visually removes from the display screen the symbol GC that users have held in FIG. 5 to indicate their desire to create a new symbol. In place of the visually removed symbol GC, the method visually presents, in block 542, the temporary symbol. From the perspective of the user, this temporary symbol, not the now-invisible symbol GC, is now the object being held. However, it should be noted that the originally selected symbol, i.e., the one associated with the now-invisible GC, is still logically the selected symbol at this point.

In one embodiment, the temporary symbol is visually represented by only the ghost image/bounding box of the symbol that is to be created eventually. The visual presentation of only the ghost image/bounding box advantageously reduces the number of screen updates that must be performed when this temporary symbol is moved to its final location on the display screen. To improve visual aesthetics, however, one embodiment may show all the details of the symbol that is to be created when rendering the temporary symbol.

In block 544, the method connects a temporary connector to a predefined location on the selected symbol. In one embodiment, the aforementioned predefined location on the selected symbol is defined in advance to be the location on the selected symbol where the manipulated GC is coupled. However, the predefined location on the selected symbol may, in other instances, represents a non-arbitrary preselected location. By way of example, certain architectural or engineering symbols may have thereon specific predefined location or locations on them where connectors are allowed to be coupled. Further, the predefined location on the selected symbol may also represent its center or one of its horizontal/vertical midpoints. Alternatively, a predefined location may be dynamically determined as the temporary symbol is moved around the display screen. By way of example, it may represent the point on the boundary of the selected symbol that is closest to the temporary symbol, or the closest of a set of predefined points on the selected symbol.

In block 546, the temporary connector that is connected to the selected symbol in block 544 is also connected to a predefined location on the temporary symbol. Again, the predefined location on the temporary symbol may be defined in advance as the point on the temporary symbol boundary that is closest to the selected symbol of block 544. In other words, the point on the selected symbol may change dynamically as the temporary symbol is being moved around the display screen. The predefined location on the temporary symbol may also be certain fixed, predefined points on the temporary symbol such as its center or one of its horizontal/vertical midpoints.

In block 548, the method ascertains whether the temporary symbol is released. In one embodiment, the determination in block 548 involves checking whether the user has moused up at a user-selected location on the display screen after moving the temporary symbol around while mousing down on the temporary symbol.

If it is determined in block 548 that the temporary symbol is still being held, the method proceeds to block 550 wherein the method ascertains whether the screen pointer has been moved. In one embodiment, the determination in block 550 involves determining whether the screen pointer has been moved a predefined distance, e.g., a non-arbitrary number of pixels, from its previous location. If the screen pointer has not been moved, the method returns to block 548 wherein it again checks to see whether the temporary symbol has been released.

On the other hand, if it is determined in block 550 that the screen pointer has been moved, the method proceeds to 552 wherein the temporary symbol is correspondingly moved. Thereafter, the method returns back to block 548 wherein it again checks to see whether the temporary symbol has been released.

On the other hand, if it is determined in block 548 that the user has released the temporary symbol, e.g., mousing up at a location on the display screen in one embodiment, the method proceeds from block 548 to block 553 wherein it makes permanent the temporary symbol and the connector thereto at the location on the display screen where the user releases the temporary symbol. From block 553, the method proceeds to block 555 wherein the steps of FIG. 6 end.

Figure 7:
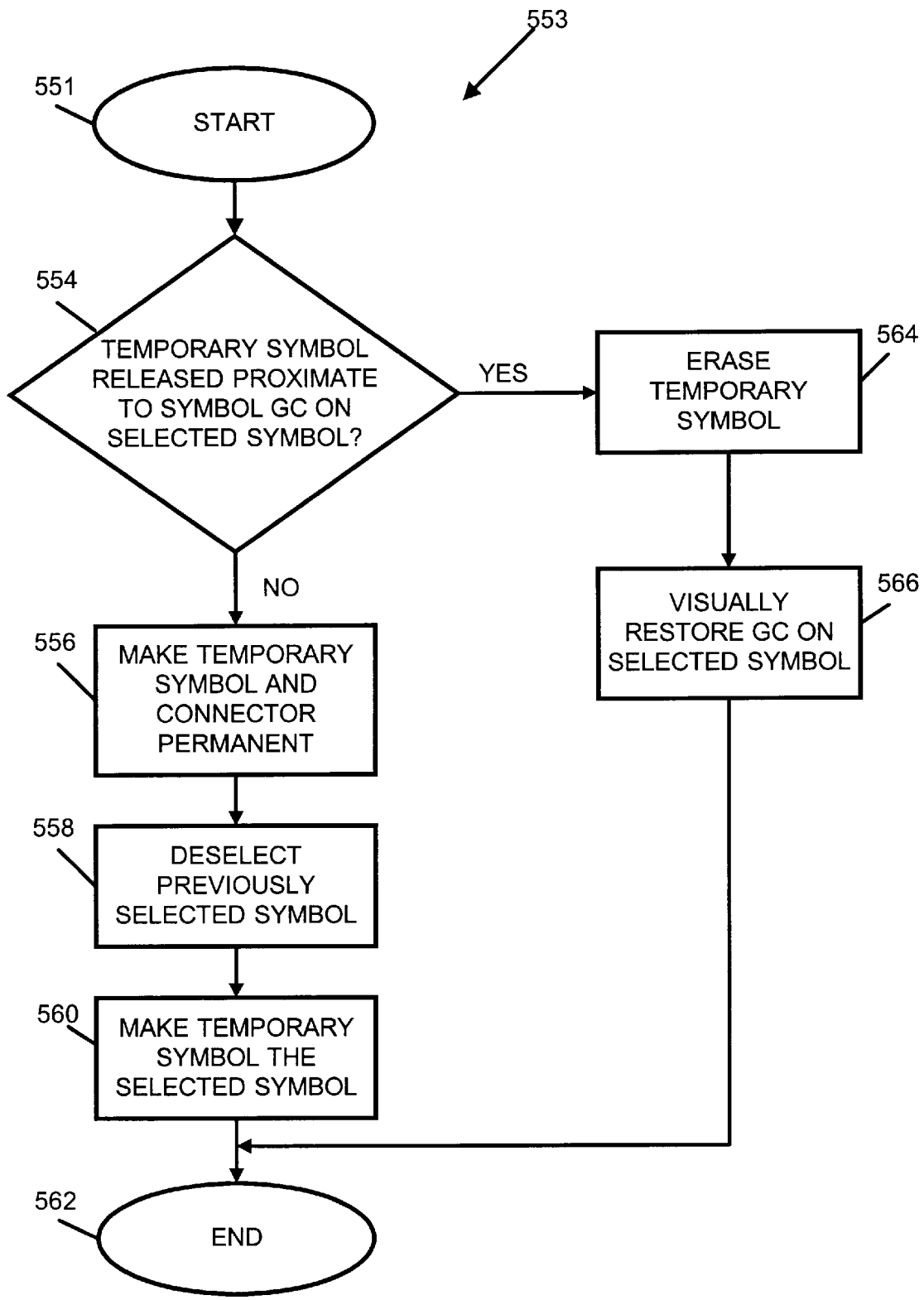
FIG. 7 is a flowchart illustrating the step of making permanent the temporary symbol and the connector thereto at a location on the display screen of block 553 of FIG. 6.

FIG. 7 is a flowchart illustrating the step of making permanent the temporary symbol and the connector thereto at a location on the display screen of block 553 of FIG. 6. FIG. 7 starts at block 551. From block 551, the method proceeds to block 554 wherein it ascertains whether the temporary symbol is released proximate to the location of the manipulated symbol GC on the selected symbol. If the temporary symbol is released proximate to, e.g., within a predefined distance of the symbol GC on the selected symbol or of the selected symbol itself, the method assumes that the user has merely clicked on the symbol GC without moving the temporary symbol created thereby. In this case, the method preferably does not make permanent the temporary symbol, i.e., create a new symbol therefrom on the display screen. The same situation may also occur when users have held a symbol GC, and after moving the temporary symbol that was created thereby, has decided to change their minds and have moved the temporary symbol back to the location where it was first presented to the user, e.g., proximate to the location of the symbol GC on the selected symbol or proximate to the selected symbol itself.

When the temporary symbol is released proximate to the location of the manipulated symbol GC on the selected symbol, the method proceeds from block 554 to block 564 wherein the image of the temporary symbol is erased in block 564, and the method visually restores the symbol GC on the selected symbol in block 566. Thereafter, the method proceeds to block 562 wherein the steps of FIG. 7 end. It is contemplated, however, that the automatic error correction feature of blocks 554, 564, and 566 may be optionally disabled in one embodiment. In this embodiment, temporary symbols and their associated temporary connectors are made permanent whenever the user releases them irrespective of the position of the screen pointer upon release.

On the other hand, if it is determined in block 554 that the temporary symbol has not been released proximate to the location of the manipulated symbol GC on the selected symbol or the symbol itself, the method proceeds to block 556 wherein the temporary symbol and its associated temporary connector are made permanent on the display screen at the location where the temporary symbol is released. In one embodiment, if only a ghost image/bounding box of the new symbol to be created is shown during the moving process, the actual detailed symbol is now presented. Likewise, if the temporary connector has been visually represented by a ghost image of the actual connector during the moving process, the actual connection may now be shown.

From block 556, the method proceeds to block 558 wherein the previously selected symbol is deselected. The newly created symbol is then made the selected symbol in block 560. In one embodiment, the user may keep the previously selected symbol selected even after a new symbol is created by, for example, shift-clicking on appropriate keyboard keys, or via other appropriate keyboard/pointing device commands. Keeping the previously selected symbol selected is advantageous in situations where a plurality of new symbols need to be drawn from an existing symbol. When a symbol is selected, GC's appear thereon. From block 560, the method proceeds to block 562 wherein, as previously discussed, the steps of FIG. 7 end.

Figure 8:
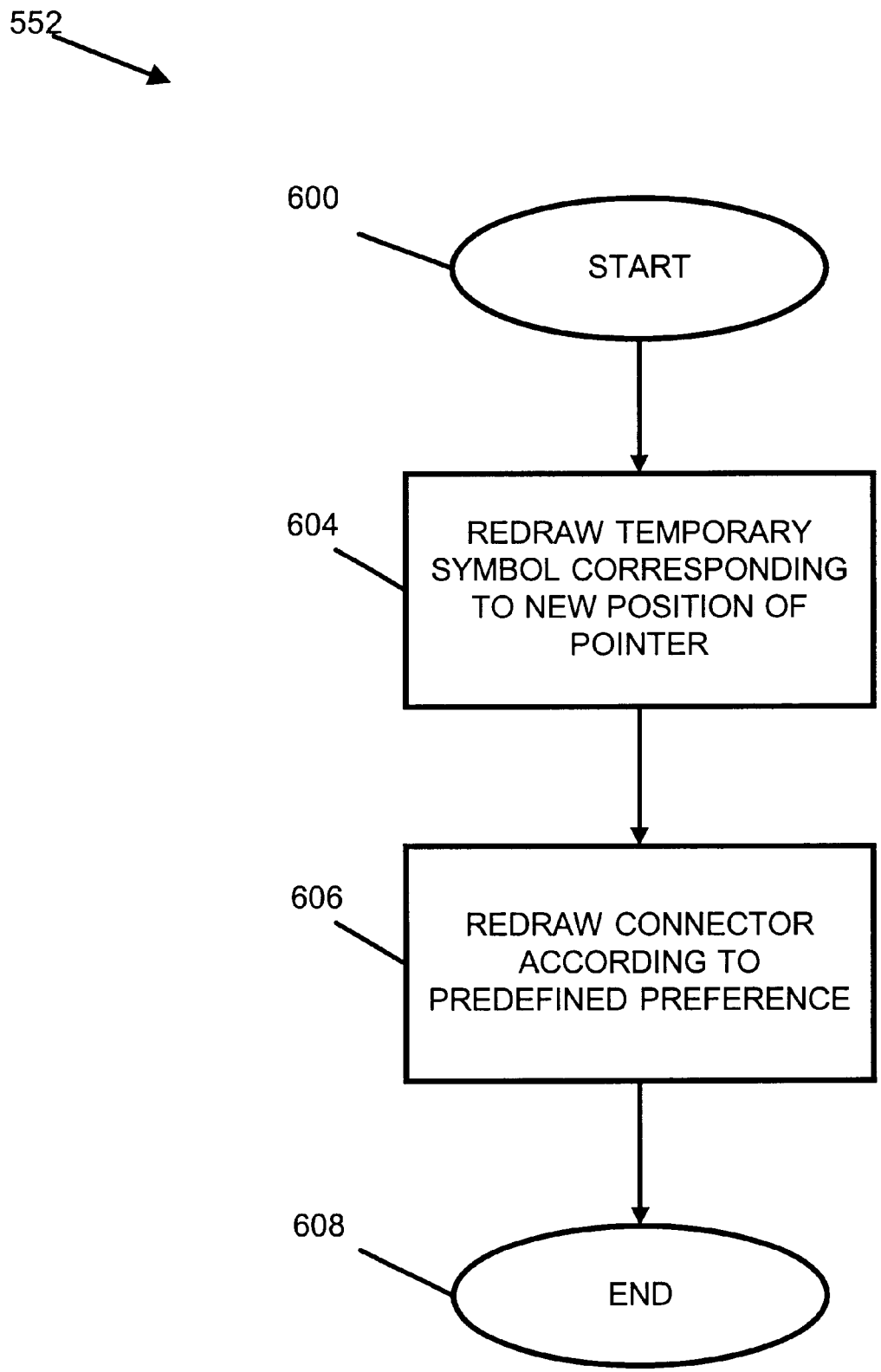
FIG. 8 is a flowchart illustrating the step of moving the temporary symbol of block 552 of FIG. 6.

FIG. 8 is a flowchart illustrating the step of moving the temporary symbol of block 552 of FIG. 6. FIG. 8 starts at block 600. In block 604, the method redraws the temporary symbol corresponding to the new position of the screen pointer. In one embodiment, redraw occurs when the pointer has moved by at least one display screen pixel. In another embodiment, the invention advantageously redraws the temporary symbol at a new pointer location only if the pointer has moved by a predetermined number of pixels, say five, to reduce the number of redraws.

In block 606, the method then redraws the temporary connector according to the user's predefined preference. Block 606 will be explained in greater detail in a subsequent FIG. 9. In block 608, the steps of FIG. 8 end.

Figure 9:
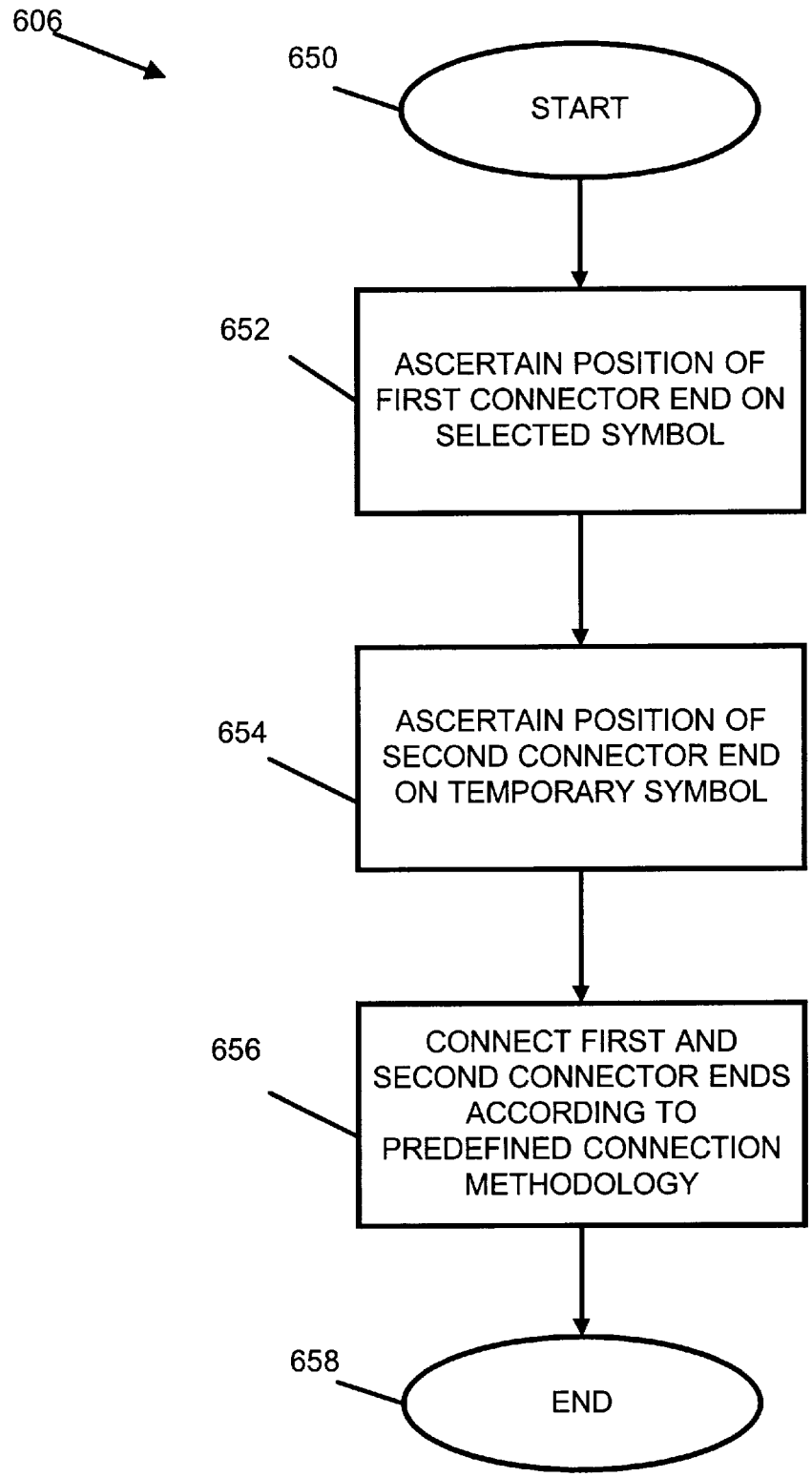
FIG. 9 is a flowchart illustrating the step of redrawing the connector according the user's predefined preference of block 606 of FIG. 8.

FIG. 9 is a flowchart illustrating the step of redrawing the connector according the user's predefined preference of block 606 of FIG. 8. FIG. 9 starts at block 650. In block 652, the method ascertains the position for one end, i.e., the first end, of the connector on the selected symbol. The determination in block 652 is typically done according to some predefined user preference, and/or semantic requirement. This is because a connector between two symbols may be made for either aesthetic or semantic purpose. By way of example, different considerations may be at issue when connectors are placed simply for aesthetics reasons. Examples of such connectors include stylized arrows connecting with blocks, whose precise connector positions thereon are essentially irrelevant. Other considerations may be taken into account when connectors must be made to convey semantic information, e.g., paths from decision diamonds in a flowchart, connections to pins on an integrated circuit chip, electrical connections on a circuit board, or the like.

In one embodiment, the position of the first connector end on the selected symbol is fixed irrespective of the position of the temporary symbol to which it is connected. In another embodiment, the position of the first connector end on the selected symbol may represent the closest permissible of a set of connecting points to the temporary symbol. For example, the position of the first connector end may represent the closest of the horizontal/vertical midpoints if the horizontal/vertical midpoints are defined as the permissible connecting points on the selected symbol.

In another embodiment, the center of the selected symbol itself may be defined as the position of the first connector end. In this case, it may be preferable in some cases that the connector visually terminates at the boundary of the symbol instead of at the center. In other cases, the vertices of a symbol, e.g., corners of a square, may be defined by the user to be the permissible connecting points, out of which the position of the first connector end may be selected. Other non-arbitrary, specific positions on the selected symbol may also be predefined to be the position where a new connector should be connected. An example of this involves pins on an integrated circuit device.

In block 654, the method ascertains the position of the second connector end on the temporary symbol. It should be noted that the options for determining the position of the second connector end on the temporary symbol are substantially the same as the options available for determining the position of the first connector end on the selected symbol.

In block 656, the method then connects the first connector end and the second connector end together in accordance with some user predefined connection methodology. Examples of predefined connection methodologies include right-angled connection, e.g., the right-angled connection of FIG. 3, straight (direct symbol-to-symbol) connection of FIG. 4C, dotted line, arrows, smooth curve (beziere), center-to-center, and the like. In one embodiment, intelligence may be provided to allow connectors to thread around intervening objects on the display screen or to be spaced at a predetermined distance from existing objects/connectors. In drawing electrical diagrams, for example, the distance between a connector, representing a conductor, and other devices may be governed by a set of electrical design rules, which dictate how far apart they must be.

Figure 10:
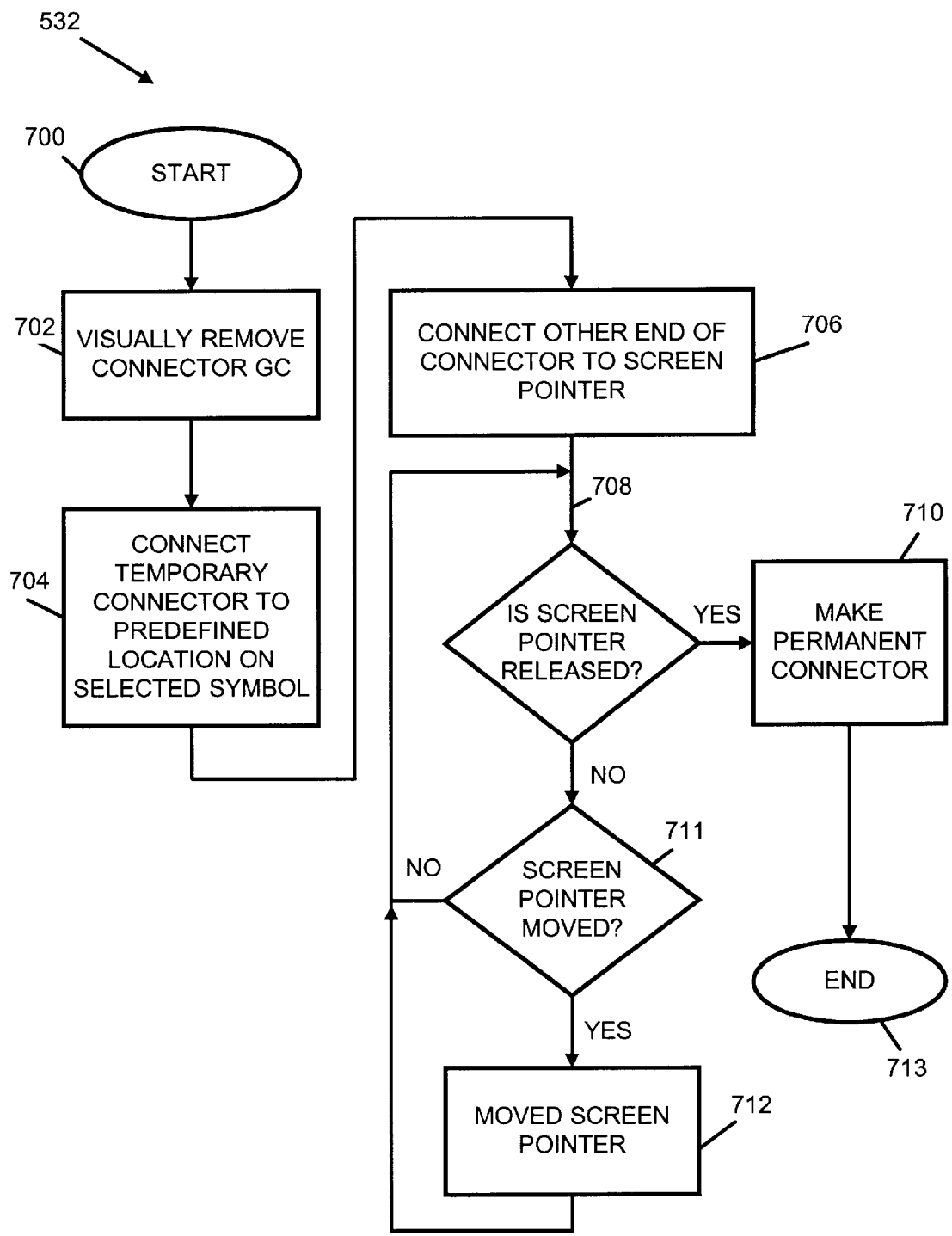
FIG. 10 is a flowchart illustrating the step of drawing a temporary connector of block 532 of FIG. 5.

FIG. 10 is a flowchart illustrating the step of drawing a temporary connector of block 532 of FIG. 5. The method of FIG. 10 is invoked when the user desires to draw a new connector without creating a new symbol. In one embodiment, the user invokes the method of FIG. 10 by holding a connector GC, e.g., one of connectors 410(a)–(d) of FIG. 3. FIG. 10 starts at block 700. From block 700, the method proceeds to block 702 wherein the connector GC is visually removed from the display screen. In one embodiment, the removal of the connector GC may be accomplished via an animation sequence, which may include sound. Note that after the step of block 702 is performed, the selected symbol from which the connector GC is removed is still logically the "selected" symbol.

In block 704, the method connects a temporary connector to a predefined location on the selected symbol. The options for determining the predefined location on the selected symbol are substantially similar to those available in block 544 of FIG. 6. The temporary connector is now deemed the object being held and is capable of being moved around the display screen to either terminate where the user releases it or for connecting to another object. In block 706, the method connects the other end of the connector of block 704 to the screen pointer.

From block 706, the method proceeds to block 708 wherein it ascertains whether the screen pointer is released. If not, the method proceeds to block 711 wherein it ascertains whether the screen pointer has been moved. The determination of whether the screen pointer has moved is substantially similar to that undertaken in block 550 of FIG. 6.

If it is ascertained in block 711 that the screen pointer has not moved from its previous location, the method returns to block 708 to again check whether the screen pointer has been released. On the other hand, if it is determined in block 711 that the screen pointer has moved from its previous location, the method proceeds to block 712 wherein the screen pointer is moved. Thereafter, the method returns to block 708 wherein it again checks to see if the user has released the screen pointer.

If it is determined in block 708 that the user has released the screen pointer, the method proceeds to block 710 wherein the connector is made permanent at the location on the display screen where the user releases the screen pointer. From block 710, the method proceeds to block 713 wherein the steps of FIG. 10 end.

Figure 11:
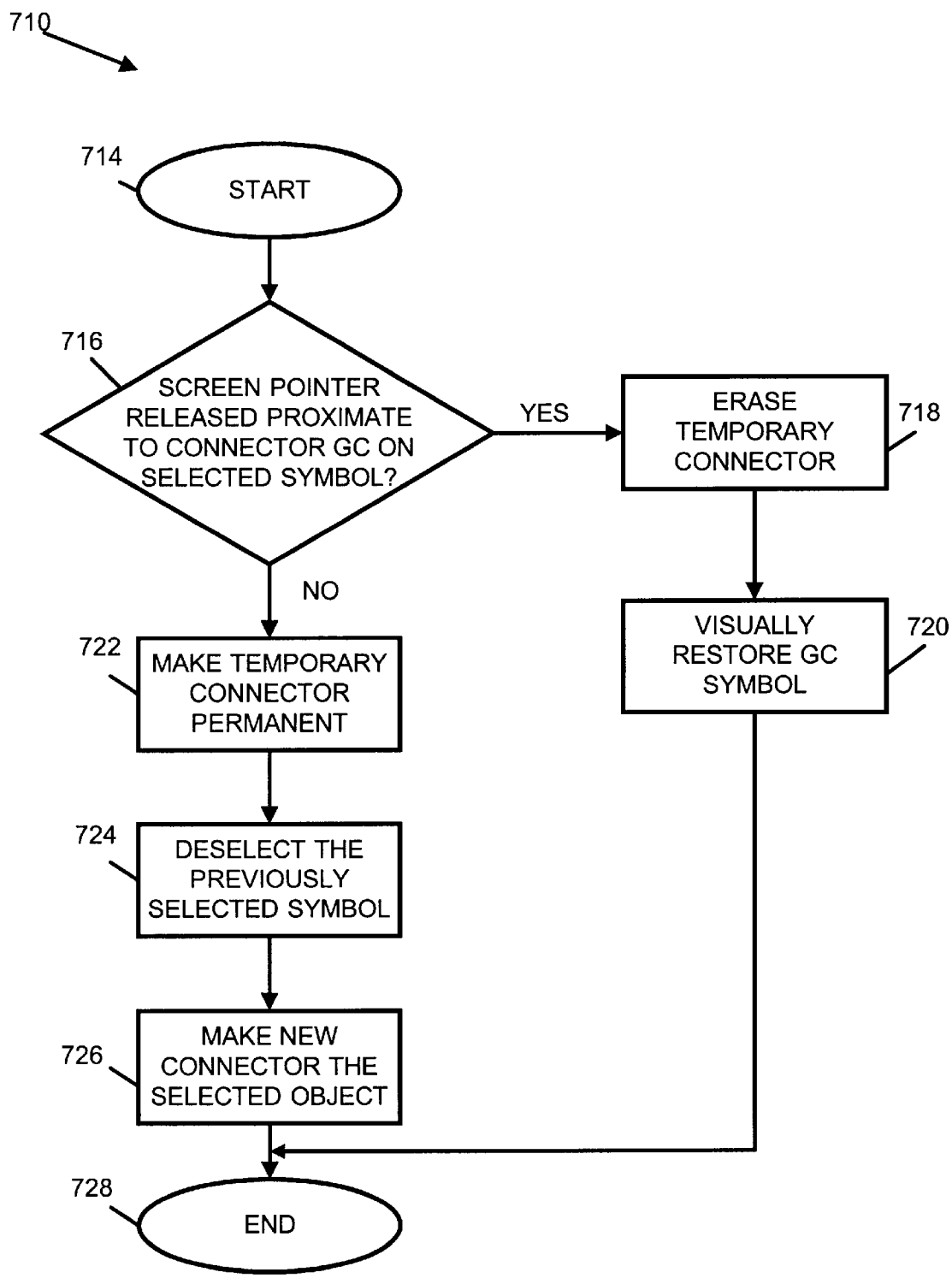
FIG. 11 is a flowchart illustrating the step of making the connector permanent of block 710 in FIG. 10.

FIG. 11 is a flowchart illustrating the step of making the connector permanent of block 710 in FIG. 10. FIG. 11 starts at block 714. In block 716, the method ascertains whether the screen pointer is released proximate to the manipulated connector GC on the selected symbol. In one embodiment, if the user released the screen pointer within a predefined distance of the connector GC earlier manipulated, the method assumes that the user has changed his or her mind and does not permanently create a new connector from the temporary connector. In this case, the method proceeds to block 718 wherein the temporary connector is visually removed from the display screen, and the connector GC which was visually removed from the display screen in block 702 of FIG. 10 is restored in block 720. Thereafter, the method proceeds to block 728 wherein the steps of FIG. 11 end. It is contemplated, however, that the automatic error correction feature of blocks 716, 718, and 720 may be optionally disabled in one embodiment. In this embodiment, temporary connectors are made permanent whenever the user releases them irrespective of the position of the screen pointer upon release.

On the other hand, if it is determined in block 716 that the screen pointer has not been released proximate to the connector graphical controller (GC) on the selected symbol, the method proceeds from block 716 to block 722 wherein a new permanent connector is created out of the temporary connector. By way of example, if the connector methodology is a solid line and the method has shown a dashed line for temporary versions of the connector while it is being moved around the display screen, the solid line may be shown in block 722 as the new connector is made permanent. In block 724, the method deselects the previously selected symbol and makes the new connector the selected object in block 726 for a subsequent manipulation. Again, the user may, through an appropriate keyboard and/or pointing device command, keep the previously selected symbol selected. The ability to keep the previously selected symbol selected even after the new connector is made permanent is advantageous in situations where multiple new connectors may need to be created from a selected symbol. From block 726, the method proceeds to block 728 wherein the steps of FIG. 11 end.

Figure 12:
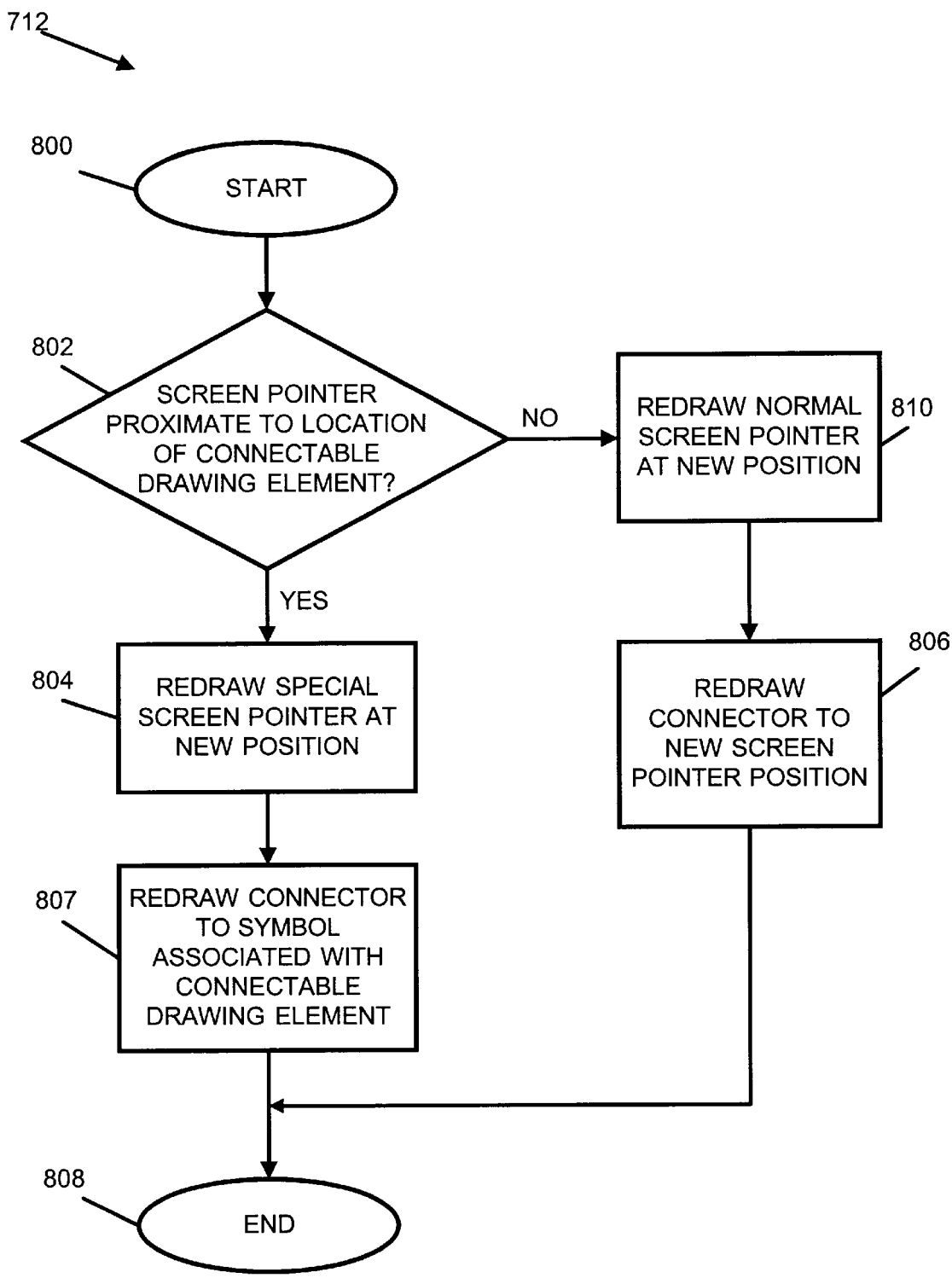
FIG. 12 is a flowchart illustrating the move screen pointer step of block 712 of FIG. 10.

FIG. 12 is a flowchart illustrating the move screen pointer step of block 712 of FIG. 10. FIG. 12 starts a block 800. In block 802, the method ascertains whether the screen pointer has been moved proximate to a connectable drawing element. In one embodiment, a connectable drawing element represents a location on an existing symbol or any other objects whereto a connection may be made (such as a horizontal/vertical midpoint on an existing symbol or one of its vertices).

If it is determined in block 802 that the screen pointer is proximate to a connectable drawing element, the method proceeds to block 804 wherein the screen pointer, in one embodiment, changes shape and is redrawn at its new position. The changing of the screen pointer shape to a special screen pointer in block 804 serves to indicate to the user that the connector drawing status has changed. Now, instead of simply terminating the connector wherever the user releases it, the new connector will preferably be connected to the symbol associated with the connectable drawing element of block 802 upon release (as implemented by the drawing step in block 807).

As is apparent from the foregoing, the method advantageously permits the user to draw, in a simple and intuitive manner, a connector from an existing symbol to another object having a connectable drawing element simply by holding a connector GC and moving the screen pointer proximate to that connectable drawing element. Further, it is not even necessary to precisely touch the connectable drawing element to be in this drawing mode. Of course, the user may advantageously define in advance the distance the screen pointer has to be from the connectable drawing element before this special drawing mode is in effect. It should be noted that the change in connector drawing status may be indicated by other means beside changing the shape of the screen pointer, e.g., an animation sequence which may include sound, visual cues such as the changing of color or shape of elements unrelated to the screen pointer such as the background, or other cues which may also include audio/visual indicators.

On the other hand, if it is determined that the screen pointer has not been moved within a predefined distance of a connectable drawing element in block 802, the method proceeds to block 810 wherein the screen pointer is redrawn at this new position on the display screen. The method then redraws the temporary connector toward the new screen pointer position in block 806 to elastically connect the temporary connector to the screen pointer at its new position. In block 808, the steps of FIG. 12 end.

Figure 13:
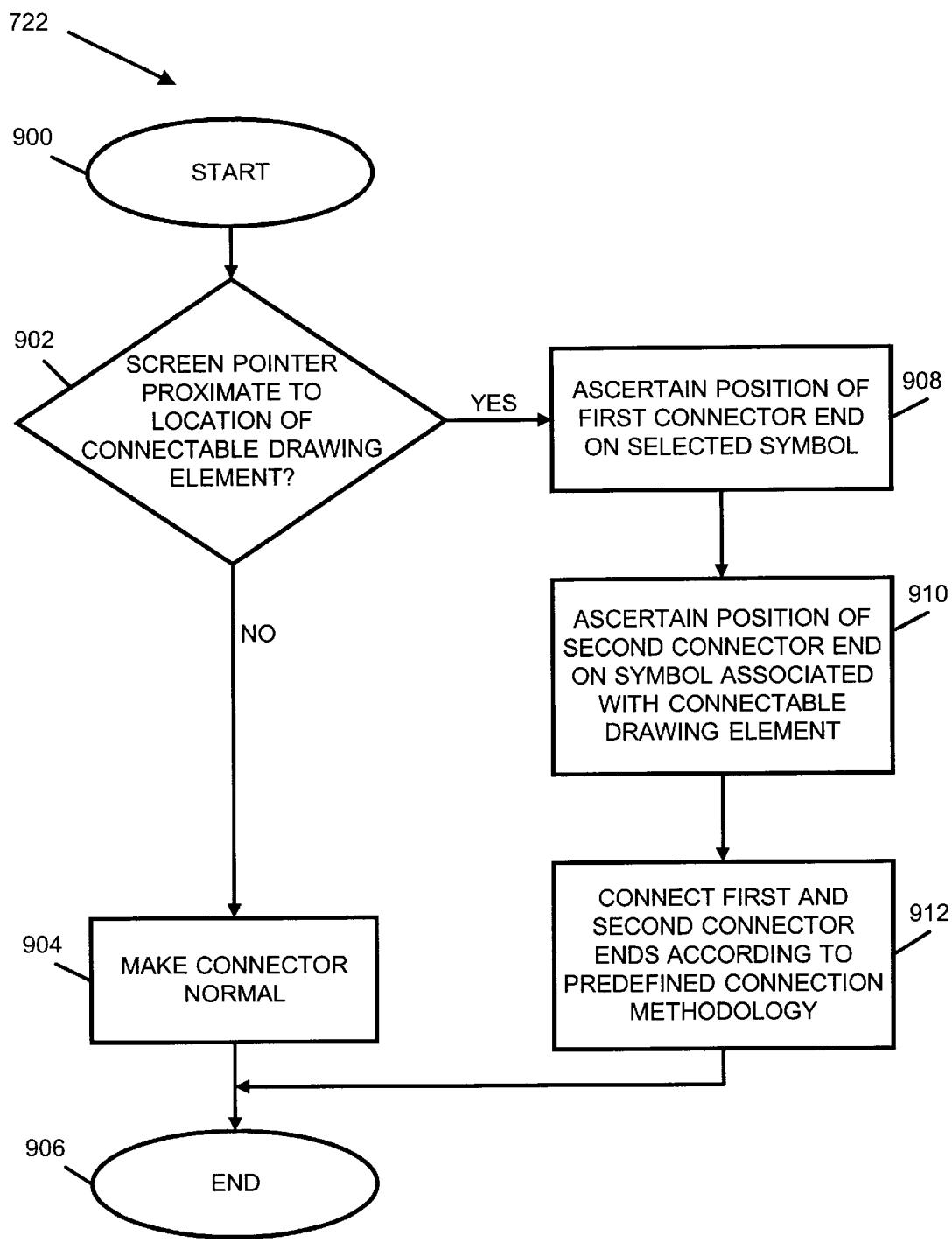
FIG. 13 is a flowchart illustrating the step of making the temporary connector permanent of block 722 of FIG. 11.

FIG. 13 is a flowchart illustrating the step of making the temporary connector permanent of block 722 of FIG. 11. FIG. 13 starts at block 900. In block 902, the method ascertains whether the screen pointer, which the user releases in block 708 of FIG. 12, is proximate to the location of a connectable drawing element. Examples of connectable drawing elements have been given earlier in connection with block 802 of FIG. 12.

If it is ascertained in block 902 that the screen pointer is proximate to the location of a connectable drawing element, the method proceeds to block 908 wherein it ascertains the position of the first connector end on the selected symbol. Options for ascertaining the position of the first connector end on the selected symbol in block 908 are similar to those discussed in connection with block 652 of FIG. 9.

Thereafter, the method proceeds to block 910 wherein the position of the second connector end on the object, which is associated with the connectable drawing element of block 902, is ascertained. Further, options for ascertaining the position of the second connector end in block 910 are substantially similar to those discussed in connection with block 654 of FIG. 9. In block 912, the method connects the first connector end and the second connector end together using a connector in accordance with a predefined connection methodology. Examples of predefined connection methodologies have been discussed in connection with block 656 of FIG. 9. From block 912, the method proceeds to block 906 wherein the steps of FIG. 13 end.

On the other hand, if it is determined in block 902 that the screen pointer is not within a predefined distance of a connectable drawing element, the method proceeds to block 904 wherein a normal connector is made from the temporary connector shown thus far. By way of example, if the temporary connector has been represented visually thus far as a ghost image of a connector, e.g., for ease of screen updates and visual distinction during the moving process, the method displays a true representation of the connector in block 904. From block 904, the method proceeds to block 906 wherein, as mentioned earlier, the steps of FIG. 13 end.

Although the foregoing invention has been described in some detail for purposes of clarity of understanding, it will be apparent that certain changes and modifications may be practiced within the scope of the appended claims without departing from the scope and spirit of the present invention. Further, although the invention is described using flow diagrams as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein. As a specific example, where it is mentioned herein that the method waits for some event to occur, other processes and events may simultaneously be executed. Therefore, the scope of the invention is not limited to the specific examples given herein but is set forth in the appended claims.

What is claimed is:

1. An apparatus in a computer having a display screen and a pointing device for creating a diagram, said diagram having a plurality of symbols, comprising:
   a graphical controller, said graphical controller being associated with a selected symbol of said diagram on said display screen of said computer, including:
   a connector graphical controller configured for creating a first connector, said connector graphical controller being associated with said graphical controller, said first connector being coupled to said selected symbol on said display screen upon being created; and
   a symbol graphical controller for creating a new symbol, said symbol graphical controller being associated with said graphical controller, said new symbol being coupled to said selected symbol by a second connector upon being created, said symbol graphical controller being visually distinct from said connector graphical controller on said display screen.

2. The apparatus of claim 1 wherein a temporary version of said new symbol is created when said symbol graphical controller is held by said pointing device, said temporary version of said new symbol being capable of being moved around said display screen responsive to movement of said pointing device while said temporary version of said new symbol is held, said temporary version of said new symbol being made permanent into said new symbol when said temporary version of said new symbol is released at a user selected location on said display screen.

3. The apparatus of claim 2 wherein said temporary version of said new symbol is coupled to a temporary version of said second connector while said temporary version of said new symbol is held, said temporary version of said new symbol and said temporary version of said second connector being visible on said display screen while said temporary version of said new symbol is moved around said display screen responsive to movement of said pointing device.

4. The apparatus of claim 3 wherein said temporary version of said new symbol is made permanent into said new symbol only if said user selected location is a predefined distance apart from said symbol graphical controller, said temporary version of said new symbol being visually removed from said display screen if said user selected location is less than said predefined distance apart from said symbol graphical controller.

5. The apparatus of claim 1 wherein a temporary version of said first connector is created while said first connector graphical controller is held by said pointing device, said temporary version of said first connector being capable of being elastically coupled between a screen pointer associated with said pointing device and said selected symbol as said screen pointer is moved around said display screen responsive to movement of said pointing device while said first connector is held, said temporary version of said first connector being made permanent into said first connector when said first connector is released at a user selected location on said display screen.

6. The apparatus of claim 5 wherein said temporary version of said first connector is visible on said display screen while said screen pointer is moved around said display screen.

7. The apparatus of claim 6 wherein said temporary version of said first connector is made permanent into said first connector only if said user selected location is a predefined distance apart from said connector graphical controller, said temporary version of said first connector being visually removed from said display screen if said user selected location is less than said predefined distance apart from said connector graphical controller.

8. The apparatus of claim 1 wherein a shape of said connector graphical controller reflects a connection methodology employed for creating said first connector.

9. The apparatus of claim 1 wherein a shape of said symbol graphical controller reflects a shape of said new symbol.

10. In a computer having a display screen and a pointing device, a method of creating a new symbol in a diagram having a plurality of symbols, comprising:
    providing a connector graphical controller on a selected symbol of said plurality of symbols on said display screen, said connector graphical controller being used for creating a connector without an associated symbol;
    providing a symbol graphical controller on said selected symbol, said symbol graphical controller being visually distinct from said connector graphical controller;
    creating a temporary version of said new symbol while said symbol graphical controller is held by said pointing device, said temporary version of said new symbol being capable of being moved around said display screen responsive to movement of said pointing device while said symbol graphical controller is held;
    creating a temporary version of a connector, said temporary version of said connector being elastically coupled between said temporary version of said new symbol and said selected symbol as said temporary version of said new symbol is moved around said display screen; and
    making said temporary version of said new symbol permanent into said new symbol when said temporary version of said new symbol is released at a location on said display screen.

11. The method of claim 10 wherein said temporary version of said new symbol and said temporary version of said connector are visible on said display screen while said temporary version of said new symbol is moved around said display screen.

12. The method of claim 10 wherein said temporary version of said new symbol is made permanent into said new symbol only if said location is a predefined distance apart from said symbol graphical controller.

13. The method of claim 12 further comprising the step of removing said temporary version of said new symbol and said temporary version of said connector from said display screen if said location is less than said predefined distance apart from said symbol graphical controller.

14. The apparatus of claim 10 wherein a shape of said connector graphical controller reflects a connection methodology employed for creating said connector.

15. The apparatus of claim 10 wherein a shape of said symbol graphical controller reflects a shape of said new symbol.

16. An apparatus in a computer having a display screen and a pointing device for creating a diagram, said diagram having a plurality of symbols, comprising:

a graphical controller, said graphical controller being associated with a selected symbol of said plurality of symbols on said display screen and used for creating a first connector when both said graphical controller and another symbol of said plurality of symbols on said display screen are successively clicked by said pointing device, said first connector being coupled between said selected symbol on said display screen and said another symbol of said plurality of symbols, said graphical controller being further used for creating a temporary new symbol when said graphical controller is held by said pointing device, said temporary new symbol being capable of being moved around said display screen responsive to movement of said pointing device, said temporary new symbol being made permanent into a new symbol which is coupled to said selected symbol by a second connector upon being released at a user-selected location on said display screen.

17. The apparatus of claim 16 wherein the location where said first connector couples with said selected symbol is predefinable by a user.

18. The apparatus of claim 16 wherein the location where said second connector couples with said selected symbol is predefinable by a user.

19. A computer readable medium containing program instructions for providing a connector graphical controller on a selected symbol of said plurality of symbols on said display screen, said connector graphical controller being used for creating a connector without an associated symbol;

providing a symbol graphical controller on said selected symbol, said symbol graphical controller being visually distinct from said connector graphical controller;

creating a temporary version of said new symbol while said symbol graphical controller is held by a pointing device of said computer, said temporary version of said new symbol being capable of being moved around said display screen responsive to movement of said pointing device while said symbol graphical controller is held;

creating a temporary version of a connector, said temporary version of said connector being elastically coupled between said temporary version of said new symbol and said selected symbol as said temporary version of said new symbol is moved around said display screen; and making said temporary version of said new symbol permanent into said new symbol when said temporary version of said new symbol is released at a user-selected location on said display screen.

20. The computer readable medium of claim 19 further containing program instructions for making said temporary version of said new symbol permanent into said new symbol only if said user selected location is a predefined distance apart from said symbol graphical controller.

21. The computer readable medium of claim 19 further containing program instructions for removing said temporary version of said new symbol and said temporary version of said connector from said display screen if said user selected location is less than said predefined distance apart from said symbol graphical controller.

22. A computer readable medium having thereon instructions for creating a new symbol in a diagram having a selected symbol, said instructions being configured for use in a computer having a display screen and a pointing device, said computer readable medium comprises:

instructions for providing a symbol graphical controller associated with said selected symbol;

instructions for providing a connector graphical controller associated with said selected symbol on said display screen, said connector graphical controller being configured for creating a connector and being visually distinct from said connector graphical controller;

instructions for creating a temporary version of said new symbol while said symbol graphical controller is held by said pointing device, said temporary version of said new symbol being capable of being moved around said display screen responsive to movement of said pointing device while said symbol graphical controller is held;

instructions for creating a temporary version of a connector, said temporary version of said connector being elastically coupled between said temporary version of said new symbol and said selected symbol as said temporary version of said new symbol is moved around said display screen; and instructions for making said temporary version of said new symbol permanent into said new symbol when said temporary version of said new symbol is released at a location on said display screen.

23. The computer readable medium of claim 22 wherein said temporary version of said new symbol and said temporary version of said connector are visible on said display screen while said temporary version of said new symbol is moved around said display screen.

24. The computer readable medium of claim 22 wherein said temporary version of said new symbol is made permanent into said new symbol only if said location is a predefined distance apart from said symbol graphical controller.

25. The computer readable medium of claim 24 further comprising instructions for removing said temporary version of said new symbol and said temporary version of said connector from said display screen if said location is less than said predefined distance apart from said symbol graphical controller.

26. The computer readable medium of claim 22 wherein a shape of said connector graphical controller reflects a connection methodology for said connector.

27. A computer readable medium having thereon instructions for creating a new symbol in a diagram having a selected symbol, said instructions being configured for use in a computer having a display screen and a pointing device, said computer readable medium comprises:

instructions for providing a graphical controller, said graphical controller being associated with said selected symbol on said display screen;

instructions for creating a first connector when both said graphical controller and another symbol on said display screen are successively clicked by said pointing device, said first connector being coupled between said selected symbol on said display screen and said another symbol; and instructions for creating a temporary new symbol when said graphical controller is held by said pointing device, said temporary new symbol being capable of being moved around said display screen responsive to movement of said pointing device, said temporary new symbol being made permanent into a new symbol upon being released at a user-selected location on said display screen.

28. The computer readable medium of claim 27 wherein said new symbol is automatically coupled to said selected symbol by a second connector upon being released at said user-selected location on said display screen.

29. The computer readable medium of claim 27 wherein a shape of said graphical connector reflects a connection methodology employed for creating said first connector.

* * * * *